(12) United States Patent
Lekson et al.

(10) Patent No.: US 6,623,132 B2
(45) Date of Patent: Sep. 23, 2003

(54) LIGHT COUPLER HINGEDLY ATTACHED TO A LIGHT GUIDE FOR AUTOMOTIVE LIGHTING

(75) Inventors: Matthew A. Lekson, Novi, MI (US); Jianzhong Jiao, Farmington Hills, MI (US)

(73) Assignee: North American Lighting, Inc., Farmington Hills, MI (US)

( * ) Notice: Subject to any disclaimer, the term of this patent is extended or adjusted under 35 U.S.C. 154(b) by 41 days.

(21) Appl. No.: 09/999,501

(22) Filed: Oct. 19, 2001

(65) Prior Publication Data

US 2002/0071267 A1 Jun. 13, 2002

Related U.S. Application Data

(63) Continuation-in-part of application No. 09/372,567, filed on Aug. 11, 1999, now Pat. No. 6,305,813.

(51) Int. Cl.[7] ................................................ F21V 7/04
(52) U.S. Cl. ........................... 362/31; 362/26; 362/27; 362/558; 362/560; 362/555; 362/299; 362/308; 362/326; 362/581
(58) Field of Search .............................. 362/31, 26, 27, 362/558, 560, 555, 299, 308, 326, 581, 333, 285, 287

(56) References Cited

U.S. PATENT DOCUMENTS

| | | | | |
|---|---|---|---|---|
| 5,165,772 A | * | 11/1992 | Wu ............................... | 362/26 |
| 5,890,796 A | * | 4/1999 | Marinelli et al. ............ | 362/307 |
| 6,036,340 A | * | 3/2000 | Fohl et al. ................... | 362/511 |
| 6,305,813 B1 | * | 10/2001 | Lekson et al. ................. | 362/31 |
| 6,335,999 B1 | * | 1/2002 | Winston et al. .............. | 385/146 |

* cited by examiner

Primary Examiner—Sandra O'Shea
Assistant Examiner—Bertrand Zeade
(74) Attorney, Agent, or Firm—McDonnell Boehnen Hulbert & Berghoff (57) ABSTRACT

A display device and a lighting system is provided for providing lighting in exterior and interior lighting applications, such as for center high mount stop lights (CHMSL) and other automotive lighting applications. The display device uses a light guide having light couplers hingedly attached to a light source end for receiving light from at least one light source. The light guide extends from the light source end with a light emitting surface and a light guide surface opposite the light emitting surface. The light emitting surface and the light guide surface extend in a direction substantially parallel to the direction of the light received from the light source. The light guide surface has a plurality of surface sections extending at angles relative to one another. The surface sections may be angled at alternating sections to direct light towards the light emitting surface using total internal reflection.

29 Claims, 6 Drawing Sheets

LIGHT COUPLER HINGEDLY ATTACHED TO A LIGHT GUIDE FOR AUTOMOTIVE LIGHTING

CROSS-REFERENCE TO RELATED APPLICATIONS

The present application is a continuation-in-part of U.S. patent application Ser. No. 09/372,567; filed on Aug. 11, 1999, now U.S. Pat. No. 6,305,813 the full disclosure of which is incorporated herein by reference.

FIELD OF THE INVENTION

The present invention relates to the field of illuminating systems, and more particularly, to the field of display devices used in automotive lighting.

BACKGROUND OF THE INVENTION

Center high mount stop lights (CHMSL) are red colored, light emitting display devices that are mounted to illuminate to the rear of an automobile from a position that is elevated and roughly center to the stop lights on the right and left sides of the rear end of the automobile. Conventional CHMSLs consist of a lamp assembly having a housing containing an external lens with a bulb. The housing typically has a reflective coating on the inside surface. The lamp assembly may come in various shapes and sizes. Many of these assemblies require several components to be connected together. For example, in addition to the lens and housing, a separate bracket may be included to facilitate the attachment of a bulb socket. The complexity of the structure of CHMSLs may add significantly to the cost of manufacturing the CHMSLs. This in turn adds to the cost of the automobile.

CHMSLs may be mounted in any part of the rear of the automobile that allows the CHMSL to be elevated and centered relative to the low-mounted brake lights. Because of its elevated position, the visibility of CHMSLs may be improved by designing it to illuminate with a high-intensity beam having a light spread distribution in the vertical direction that facilitates visibility from different elevations. Manufacturers are now required to produce CHMSLs having a light spread distribution in accordance with specifications set by government regulations, such as for example, the FMVSS 571.108 issued by the National Highway Traffic Safety Administration.

The use of light guides for exterior lighting is known in the art. U.S. Pat. No. 5,772,304 to Smith (hereinafter "Smith") discloses a rear exterior lamp that uses a light guide in which a three-dimensional tapered surface reflects light through a light panel. One disadvantage of using Smith, particularly for use as a CHMSL, is that the light emitted by the light panel having the tapered surface does not diverge to provide a light spread distribution. The light emitted by Smith is substantially parallel making it unsuitable for use as a CHMSL or any other exterior lighting requiring a light spread distribution. Smith also requires a light panel and other parts that result in a structure that is significantly complex making it a costly solution in terms of labor and material.

U.S. patent application Ser. No. 5,165,772 to Wu (hereinafter "Wu") discloses a visual display device structure using a light guide that is particularly designed for use as a CHMSL. The device in Wu includes a substrate material that is stepped on one surface, each step being at an angle to provide a light distribution spread using the light diverging through refraction at the step. One disadvantage with using Wu, however, is that its use is limited to CHMSLs that are mounted at small angles. Another disadvantage with Wu is that the stepped surface makes the light guide in Wu unsuitable for use as exterior lighting.

One of ordinary skill in the art will appreciate that while the present discussion focuses on CHMSLs, the principles, problems and solutions may also apply to other lighting systems. For example, it may be desirable in other lighting applications such as tail lights, other signal lights for automobiles, street lights, interior lighting, courtesy lighting and other signal lighting to illuminate at a selected light spread distribution.

It would be desirable to have an exterior lighting system that may be made to provide a high-intensity beam with a selected light spread distribution.

It would also be desirable to provide an exterior light with a simple structure that may be manufactured at a low cost. For example, it would be desirable to have an exterior light that uses no external lens.

It would also be desirable to provide an external lighting system that is flexible in design to permit a variety of configurations and a unique appearance.

It would also be desirable to provide an adjustable exterior lighting device that may control the direction of a light distribution.

SUMMARY OF THE INVENTION

In view of the above, a lighting system is provided that uses at least one light coupler operable to receive light from at least one light source and also operable to distribute the light in a first direction. A light guide made of a substrate material is provided having a light source end hingedly attached adjacent the at least one light coupler to receive the distributed light. A light emitting surface extends from the light source end substantially along the first direction. A light guide surface extends from the light source substantially along the first direction and opposite the light emitting surface.

In another embodiment, a display device is provided that uses at least one light coupler operable to receive light from at least one light source and also operable to distribute the light in a first direction. A light guide made of a substrate material is provided having a light source end hingedly attached adjacent the at least one light coupler to receive the distributed light. A light emitting surface extends from the light source end substantially along the first direction. A light guide surface extends from the light source substantially along the first direction and opposite the light emitting surface. The light guide surface includes a plurality of first surface sections. Each first surface section may be separated by at least one of a plurality of second surface sections. The first surface sections extend at different angles from the second surface sections. At least one of the first and second surface sections may be at a reflective angle to provide reflection of the light generated by the light source. The reflected light may be emitted from the light emitting surface with a light distribution spread in a second direction.

These as well as other features and advantages of the present invention will become apparent to those of ordinary skill in the art by reading the following detailed description, with appropriate reference to the accompanying drawings.

DESCRIPTION OF FIGURES

Presently preferred embodiments of the invention are described below in conjunction with the appended drawing figures, wherein like reference numerals refer to like elements in the various figures, and wherein.

DETAILED DESCRIPTION OF AN EXEMPLARY EMBODIMENT

Figure 1:
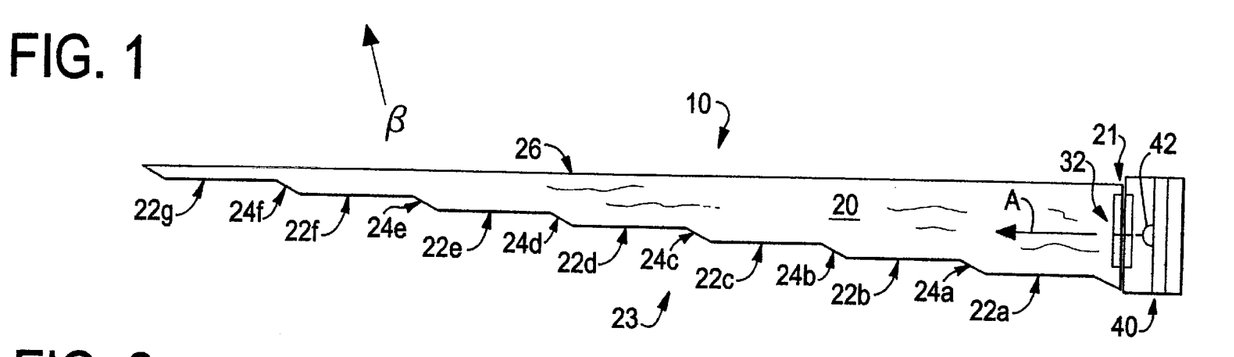
FIG. 1 is a side view of a display device according to one embodiment of the invention.

FIG. 1 is a side view of a display device 10 having a light source assembly 40, at least one light coupler 32 and a light guide 20. The light guide 20 has a light source end 21 physically joined to the light coupler 32 and to the light source assembly 40. The light source assembly 40 includes at least one light source 42 for generating a light that radiates generally parallel to the length of the light guide as indicated by the arrow labeled A. The light is passed through by the light coupler 32 into the light guide 20.

The light guide 20 includes a light emitting surface 26 and a light guide surface 23. The light guide 20 is comprised of a substrate material that has a refractive index that is greater than the medium contacting the light emitting surface 26 and the light guide surface 23. The light emitting surface 26 of the display device 10 shown in FIG. 1 is advantageously a smooth surface precluding the need for a separate exterior lens. The medium contacting the light emitting surface 26 is therefore typically air. The medium contacting the light guide surface 23 may be any medium having a refractive index that is less than that of the substrate material.

The light guide surface 23 has a plurality of first surface sections 22a–g and a plurality of second surface sections 24a–f. The first and second surface sections 22a–g, 24a–f are generally planar sections extending from the light source end 21 at planar angles to one another. The angular relationship between the first and second surface sections 22a–g, 24a–f direct the light within the light guide 20 by total internal reflection. The light radiating in the direction A that is incident to the first and/or second surface sections 22a–g, 24a–f at an angle that is less than a critical angle for total internal reflection is reflected towards the light emitting surface 26. The light is reflected such that it is incident to the light emitting surface 26 at an angle that is greater than the critical angle and therefore refracted out in the general direction at B. In accordance with the principles of total internal reflection, the critical angle is the angle formed by the direction of the incident light and the surface upon which it is incident beyond which the incident light is refracted through the surface.

The light guide 20 is comprised of a solid substrate material such as moldable plastics or glass. Moldable plastics that may be used include acrylic and polycarbonates. The substrate material may be made of a colored material (e.g. red, yellow, etc.) in accordance with the specific purpose for which the light is to be used. For example, if the display device 10 is used as a center high-mount stop light (CHMSL) it will be colored red. Alternatively, the substrate material may be a clear color such that the color of the light emitted may be determined by the light source.

The light source assembly 40 includes at least one light source 42. The light source 42 may include any light source that may be used in exterior automotive lighting, such as a light emitting diode (LED), a fiber optic device output, and an incandescent lamp. The light source 42 may also include neon or other tubular sources such as cold cathode fluorescent sources. In a preferred embodiment, the light source 42 includes a plurality of LEDs arranged linearly at the light source end 21 of the light guide 20. The LED may be any color such as red, yellow, or white.

Figure 2:
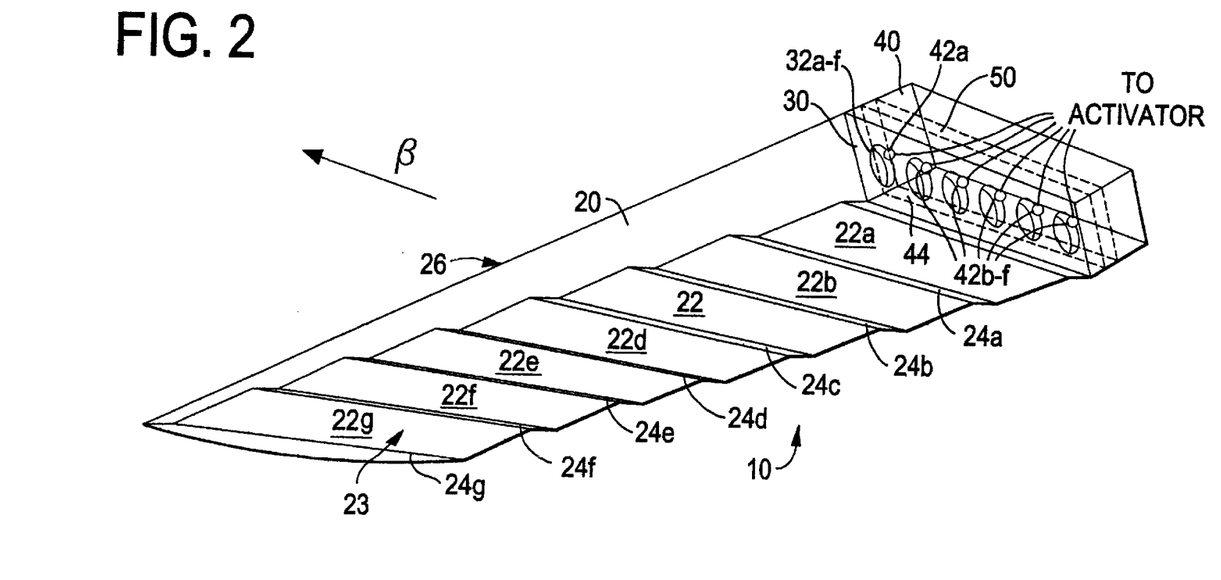
FIG. 2 is a perspective view of the display device shown in FIG. 1.

FIG. 2 is a perspective view of the display device 10 of FIG. 1. The light source assembly 40 in FIG. 2 is depicted as transparent to illustrate any relevant detail inside the assembly 40. The light source assembly 40 includes a light source circuit board 44 on which the light sources 42a–f are mounted. The light sources 42 may be surface-mounted, or mounted on leads. Each light source 42a–f includes a connection 50 that is connected to an activator that controls the on and off state of the display device 10. For example, the activator may be a brake pedal in an automobile, such that when the brake pedal is depressed, the display device 10 illuminates light.

Shown in FIG. 2, each light source 42a–f is positioned in close proximity to a corresponding light coupler 32a–f. The light couplers 32a–f receive the light generated by the light sources 42a–f and couples the light into the light guide 20. In a preferred embodiment, the light couplers 32a–f diverge or spread the light such that, incident light passes through the light guide at angles that permit reflection off of the first and/or second surface sections 22, 24. The light couplers 32a–f may collimate the light, or couple collimated light, such that it reflects off any of the second surface sections 22a–g, 24a–f that are not parallel or substantially parallel to the direction of the light at A.

The light sources 42a–f shown in FIG. 2 are mounted on a light source circuit board 44, however, the light sources 42a–f may be mounted in the light source assembly 40 without a light source circuit board 44. For example, incandescent lamps may be positioned within the light source assembly 40 with a reflective backing that reflects light in the direction of the light guide 20. The reflective backing may be provided by coating the inside surface of the light source assembly 40 with a reflective material. In addition, a fiber optic source may emit light through a fiber optic cable for each light source 42a–f.

The perspective view in FIG. 2 shows the manner in which the first and second surface sections 22, 24 direct the light toward light emitting surface 26. The illumination provided by the display device 10 gives it a unique appearance that may be modified by using different orientations and angles for the surface sections 22, 24. In the light guide 20 in FIG. 2, the first surface sections 22a–g are oriented substantially parallel to the light emitting surface 26. Different orientations having different angles between the first and second surface sections 22, 24 may be used to provide illumination in the direction at B with selected light spread distributions. In addition, the configurations of the first and second surface sections 22, 24 may also be modified to vary the appearance of the display device 10 in its illuminated state. A further advantage of the display device 10 is that it may be designed to reflect light at a variety of different angles from vertical. The orientation of the first surface sections 22a–g may also influence the efficiency of the system as well.

Figure 3:
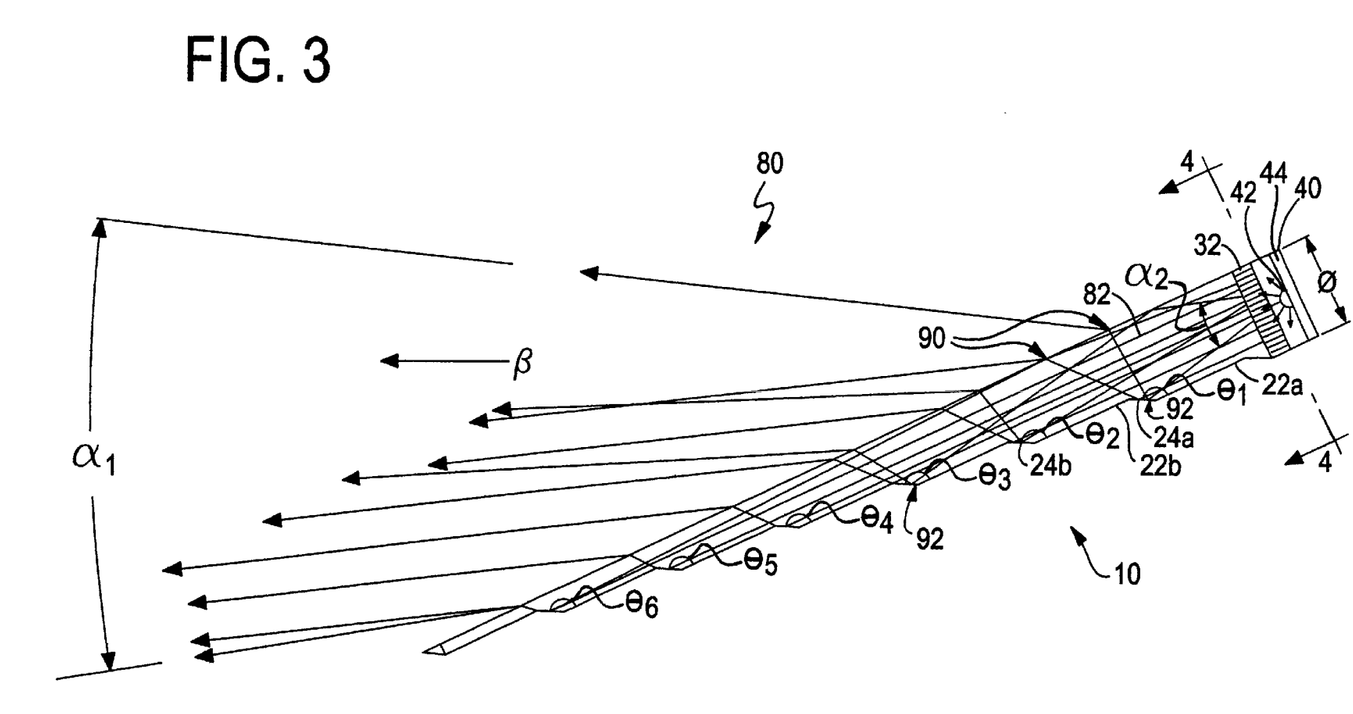
FIG. 3 is a side view of the display device of FIG. 1 showing light generated from the light source and emitted from the light guide.

FIG. 3 is a side view of the display device 10 showing light traveling through the light guide and reflecting off the surface sections to provide illumination through the light emitting surface 26. The light radiated at 80 from the light emitting surface 26 has a light spread distribution indicated by an angle $\alpha_1$. The light is generated by the light source 42 and transmitted through the light guide 20 at an internal light spread distribution indicated by angle $\alpha_2$. FIG. 3 shows how the internal light spread distribution angle $\alpha_2$, the substrate material (i.e. its refractive index), total internal reflection off of the surface sections 22, 24 and refraction at the light emitting surface 26 may determine the light spread distribution at angle $\alpha_1$. By proper selection of these factors, the light spread distribution angle $\alpha_1$ may be selected.

The light source 42 radiates light in the direction of the adjacent light coupler 32. The light coupler 32 is preferably a Fresnel lens designed to spread the light that it receives from the light source 42 at the angle $\alpha_2$. The Fresnel lens also spreads light in the horizontal direction.

The light coupler 32 may be designed to provide a light spread that is close to that of collimated light as shown at 82. The light spread from the light coupler 32 is preferably sufficient to cause total internal reflection off of the first and/or second surface sections 22, 24 and the light emitting surface 26 without emitting light through the light guide surface 23 by refraction.

In addition, the intensity of the light at 80 emitted at the light emitting surface 26 may be maximized by ensuring that all of the light internally incident upon the light guide surface 23 is internally reflected to be incident on the light emitting surface 26 such that it is emitted by refraction. Any light that is internally reflected at the light emitting surface 26 must reflect at an angle that will cause internal reflection off the light guide surface 23.

Maximum intensity may be achieved by designing the light guide surface 23 to have selected angles between the first surface sections 22a–g and the light emitting surface 26 as shown by angle $\Phi$, and to have selected reflective angles between the first surface section and the second surface section as shown by angles $\Theta_1$ through $\Theta_6$. The angles $\Theta_1$ through $\Theta_6$ formed by first and second surface sections 22, 24 shown in FIG. 3 are substantially the same. The angles $\Theta_1$ through $\Theta_6$, however, may be different to cause total internal reflection of the light in a manner that varies the light spread distribution at $\alpha_1$ as well as the appearance of the display device 10. In one presently preferred embodiment, the angles $\Theta_1$ through $\Theta_6$ are at about 151°, however, different angles may be selected for different applications and for producing different effects as discussed above.

In addition to using different angles $\Theta_1$ through $\Theta_6$, the number of surface sections on the light guide surface 23 may be varied. In FIG. 3, there are seven first surface sections 22a–g and six second surface sections 24a–f The number of surface sections may be different for specific applications to obtain desired effects, such as different appearances and intensities.

Other ways of obtaining selected light spread distributions $\alpha_1$ include using different substrate materials and light couplers 32. The substrate material of the light guide 20 may be chosen to vary the angle of refraction at the light emitting surface 26 as shown at 90. The internal light spread distribution $\alpha_2$ may also be adjusted by using different light couplers 32 to obtain a selected light spread distribution $\alpha_1$.

Figure 4A:
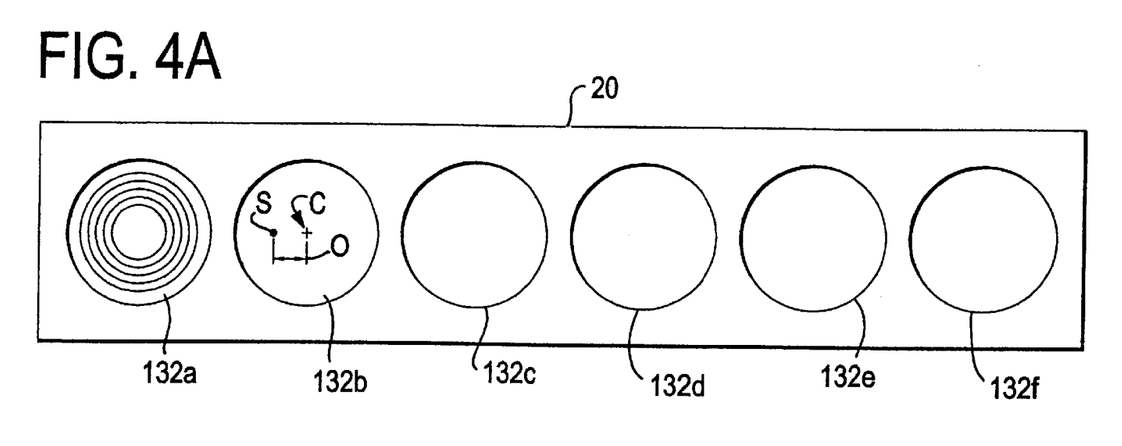
FIGS. 4A and 4B are cross-sectional views of the display device in FIG. 3 at the section 4–4'.
Figure 4B:
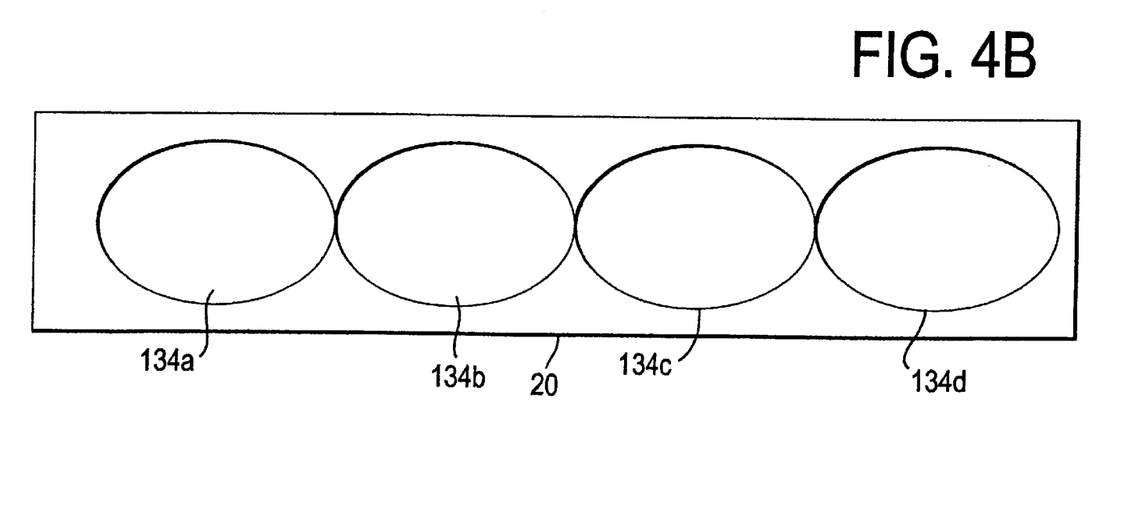

FIGS. 4A and 4B show options for light couplers 32 that provide different internal light distributions $\alpha_2$. FIG. 4A shows a cross section of the light guide 20 in FIG. 3 at section 4–4' showing round lenses 132a–f mounted at the light source end 21. The lenses in FIG. 4A are preferably Fresnel lenses such as the Fresnel lens 132a. Other lenses that may be used include divergent lenses, lens combinations such as a convergent and divergent lens combination, or any other spheric/aspheric lens capable of being configured to provide the selected internal light spread distribution $\alpha_2$ (shown in FIG. 3).

The lenses may be adjusted to provide a light spread distribution $\alpha_2$ using one of several techniques. The lenses may be adjusted to defocus the light source. The light source may also be adjusted to be offset from the center of the lenses. This is shown in FIG. 4A by a source point S offset by O relative to the center C of the lens 132b.

Another technique for providing a light spread distribution is to provide a combination of convergent and divergent lenses that do not entirely collimate the light from the light source. The lenses may also be tilted relative to the sources.

FIG. 4B shows the cross section of the light guide 20 having a plurality of lenses 134a–d that are elliptical in shape. The advantage of using the elliptical lenses 134a–d is that the amount of light radiated from the light source 42 (shown in FIG. 3) may be maximized by capturing in the lenses 134a–d light that would otherwise be directed between the lenses.

Figure 5A:
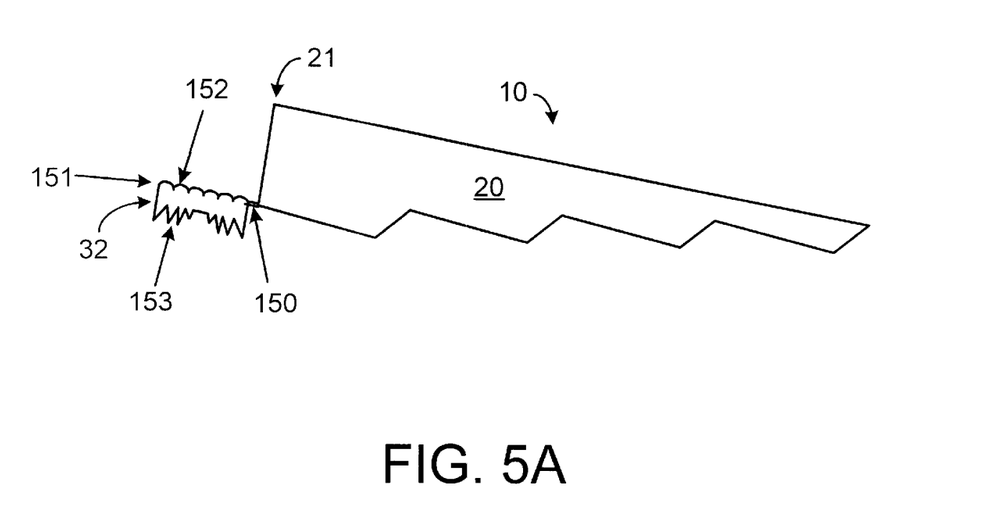
FIGS. 5A and 5B are side views of one embodiment of the display device of FIG. 1 showing a light coupler hingedly attached to the light guide.
Figure 5B:
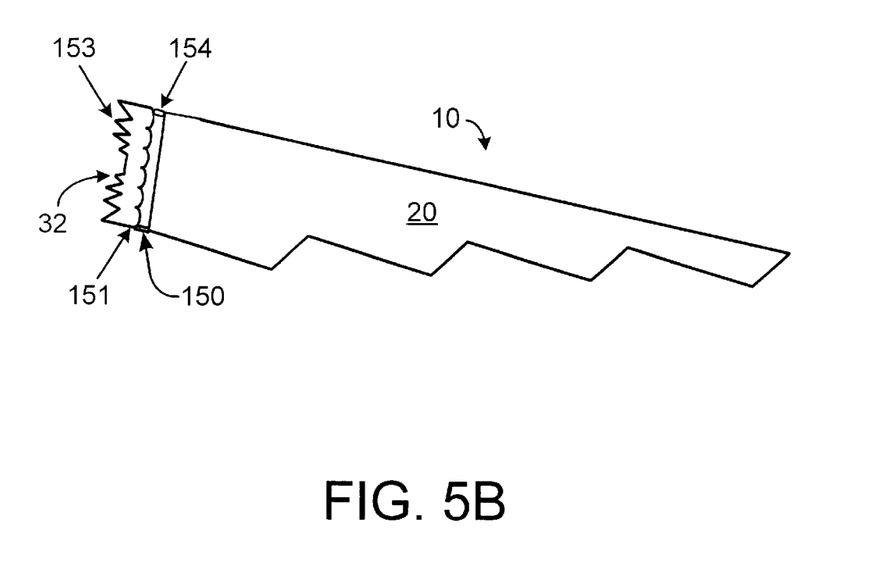

In one embodiment, the light coupler 32 may be hingedly attached to the light source end 21 of the display device 10. A hinge may act as a pivot point for the light coupler 32. Referring to FIGS. 5A and 5B, side views of the display device 10 of FIG. 1 showing a hinge 150 attaching the light coupler 32 to the light guide 20 are illustrated. The illustration of FIG. 5A shows the light coupler 32 rotated approximately 90° from the light source end 21. The illustration of FIG. 5B shows the light coupler 32 rotated approximately 0° from the light source end 21, thus the light coupler 32 is rigidly attached and operatively coupled adjacent the light source end 21. Those skilled in the art, however, will recognize that the light coupler 32 may rotate any desired amount away from the light source end 21 in order to comply with manufacturing constraints and application or engineering requirements. After rotating the light coupler 32 adjacent the light source end 21, a space may be present between the light source end 21 and the light coupler 32 to disallow the light coupler 32 from contacting the light source end 21. However, at least a section of the light coupler 32 opposite the hinge 150 may contact the light source end 21, and firmly attach to the light source end 21.

The hinge 150 allows for the light coupler 32 to rotate away from the light guide 20. This may enable the light coupler 32 to direct light in alternate directions that may be optimal for a specific application of the display device 10. The light coupler 32 may be adjusted to a desired position using the hinge 150. The light coupler 32 may be positioned at distinct angles relative to the light guide 20 using the hinge 150.

In a preferred embodiment, the hinge 150 may be comprised of the same material as the light guide 20 and the same material as the light coupler 32. The light coupler 32 may rotate using a smooth motion. The hinge 150 may operate as a "living hinge." The hinge 150 may be a small piece of the light guide 20 utilized to allow for a space between the light coupler 32 and the light guide 20. In an alternate embodiment, a plurality of hinges may be used between the light guide 20, and the light coupler 32. A plurality of hinges may be used to provide more strength, or to allow for the light coupler 32 to rotate in a different direction or at a different angle.

In an alternate embodiment, the light coupler 32 may be placed into a fixed position after rotating the light coupler 32 via the hinge 150 to a desired position. The light coupler 32 may not freely swing back and forth due to the hinge 150. The hinge 150 may provide a rigid connection allowing the light coupler 32 to remain in a fixed position. The hinge 150 may also allow the light coupler 32 to be rotated easily away from the light source end 21. An attachment may be used opposite the hinge 150 to further hold and secure the light coupler 32 in place. The attachment may be a clip 154 that snaps onto the light coupler 32 to securely hold the light coupler 32 in place.

In yet a further embodiment, the light coupler 32 has a surface 151 that adjoins the light source end 21. The surface 151 of the light coupler 32 may be comprised of the same material as the light guide 20. The surface 151 may contain optical spreading elements 152. The optical spreading elements 152 can be any standard shape, such as concave or convex fluting or bi-conic pillows. A pillow form optical spreading element 152 may comprise a bulge in the surface 151 of the light coupler 32. A pillow optical spreading element 152 may spread light and further customize the direction in which light may be directed. The optical spreading elements 152 typically serve to adjust the light beam pattern. Multiple optical spreading elements 152 may be used on the surface 151 of the light coupler 32 in order to distribute light rays at a desired angle and in a desired direction.

In another embodiment, the hinge 150 allows the light coupler 32 to direct light in a desired direction. Light rays may be directed through the light emitting surface 26 or through the light guide surface 23 depending on the angle of the light coupler 32 with respect to the light source end 21. In a preferred embodiment, one surface of the light coupler 32 contains a Fresnel lens, which may act as a light collecting agent, and the other surface of the light coupler 23 contains optical spreading elements 152 which may act as light distributing agents. The Fresnel lens may be placed on the surface of the light coupler 32 opposite the light guide 20. This allows the display device 10 to be mounted and customized in a wide variety of lighting applications.

In still another embodiment, the hinge 150 aides in molding and manufacturing the display device 10. The light coupler 32, the hinge 150, and the light guide 20 may be molded as one entity. The light coupler 32 may be molded with the hinge 150 in a position such that the light coupler 32 is rotated a substantial amount away from the light source end 21, such as 90° away from the light source end 21. In this embodiment, upon molding and manufacturing of the display device 10, access to an inner surface 151 and an outer surface 153 of the light coupler 32 is possible.

In one aspect of the present invention, optics may be molded within the inner surface 151. In another embodiment, optics may be molded within the outer surface 153, such as a Fresnel lens. Alternatively, optics may be molded on both the inner surface 151, and the outer surface 153. The hinge 150 allows access to both the inner surface 151 and the outer surface 153 of the light coupler 32 during manufacturing, thereby enabling optics to be incorporated within the surfaces of the light coupler 32.

As previously mentioned, the light coupler 32, the hinge 150, and the light guide 20 may be molded as one entity. In one embodiment, after molding the display device 10, the hinge 150 may allow for the light coupler 32 to be rotated into a fixed position. The hinge 150 may be comprised of a substrate which may be handled in a manner to adjust the position of the light coupler 32. The substrate may be the same substrate that comprises the light coupler 32. In addition, the hinge 150 may be comprised of a plastic material that can be bent and reconfigured to allow the light coupler 32 to rotate to a desired position. In one embodiment, the hinge 150 may be heated in order to soften the substrate material that the hinge 150 is comprised of to allow the light coupler 32 to rotate and readjust the position of the light coupler 32 relative to the light source end 21. In this embodiment, the hinge 150 may be comprised of a small plastic piece. The heating of the hinge 150 may be accomplished in a manner not to exceed any limitations such that may exceed the physical limitations of the hinge 150. The manner of adjusting the hinge 150 depends upon the limitations and properties of the substrate material of the hinge 150.

The entity of the light coupler 32, the hinge 150, and the light guide 20 preferably allows for the manufacturing of the entity to be completed in one process. Where the light coupler 32 and the light guide 20 are manufactured as one entity, a separate manufacturing step of connecting the light coupler 32 to the light guide 20 may be eliminated through the use of the hinge 150. As mentioned, after manufacturing of the display device 10, the light coupler 32 may be adjusted to a desired position using the living hinge 150.

In one embodiment, the light coupler 32 is manufactured without using a separate insert in the molding tool since the light coupler 32 could be pulled and molded along the same direction as the rest of the light guide 20. The tool comprises of two pieces of metal that have a specified shape of the light guide 20, the light coupler 32, and the hinge 150 carved into the tool. The substrate material of the light guide 20, the light coupler 32, and the hinge 150 may be injected into a gap of the tool, which allows the substrate material to set, producing a mold of the display device 10. The two halves of the tool may be pulled apart to allow the entity of the light coupler 32, the hinge 150, and the light guide 20 to come free. Thus, since the light coupler 32 may be part of the light guide 20, the hinge 150 can be incorporated as part of the light coupler 32 and only one part would need to be molded.

In another embodiment, the display device 10 contains only the light guide surface 23. In this embodiment, the hingedly attached light coupler 32 is used with reflector optics within the light guide 20. Use of reflector optics on the light guide 20 may only require one piece to be molded for the light guide 20. The light guide surface 23 may be a narrow elongated member with reflector optics. The light source 42 may emit light and the light may be reflected perpendicular off the light guide surface 23 and radiated in a direction perpendicular to the light guide surface 23. This allows for the light source 42 to be mounted on a side of the display device 10 instead of a front of the display device 10. The hinge 150 allows for alternate configurations of the display device 10 which further allows for the display device 10 to be customized for many specific applications.

Figure 6A:
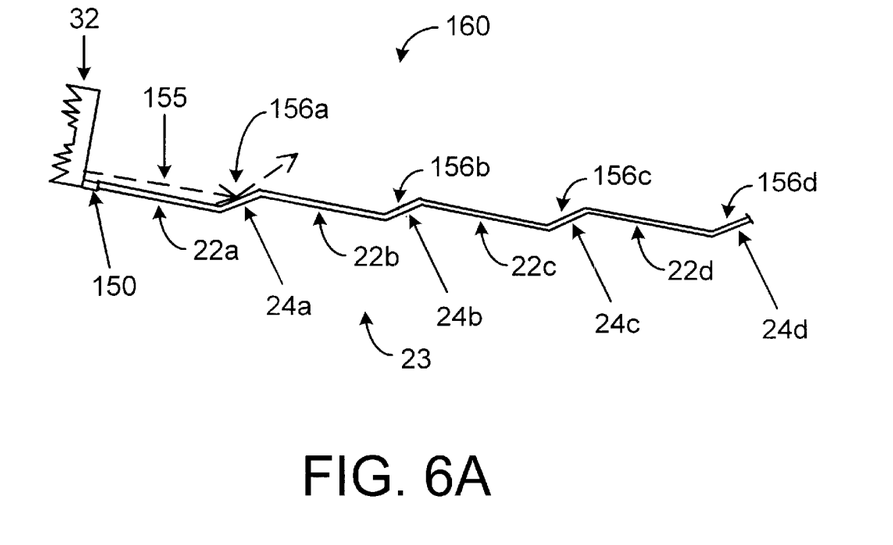
FIGS. 6A and 6B are side views of one embodiment of the display devices in FIGS. 5A and 5B.

Referring now to FIG. 6A, a side view of one embodiment of the display devices 10 of FIGS. 5A and 5B is shown. The display device 10 is illustrated with only the light guide surface 23 (e.g., a narrow light guide 160). The narrow light guide 160 may be comprised of the same material as the light guide 20 and the narrow light guide 160 may use reflector type optics to reflect light in a desired angle and direction. The reflector type optics may be realized using a treatment on the light guide surface 23. Such treatment could be a metallization on the light guide surface 23 that reflects the light emitted from the light source 42. In the metallization process, a metallic layer is deposited on the desired surface of the light guide surface 23. The treatment on the light guide surface 23 provides a surface reflection of light rays. In one such embodiment, the treatment on the light guide surface 23 may only be present on a section of the surface, or the treatment may only be present on an inner or an outer portion of the light guide surface 23. Alternatively, the treatment on the light guide surface 23 covers the entire light guide surface 23.

In yet another embodiment, the treatment is painted to reflect the light emitted from the light source 42. Such a treatment may be done on the inner surfaces 156a–d of the light guide surface 23. Alternatively, the treatment may be done on the outer surface of the second surface sections 24a–d of the light guide surface 23 if there are manufacturing constraints. One such example of a manufacturing constraint may be masking which specifies the areas of the light guide 20 to include the treatment. Other forms of added layers or treatment may include chrome sputtering, electroplating, aluminum coating, or other known types of surface treatment.

The display device operates by allowing a light ray 155 to be emitted from the light source 42 and the light ray then passes through the light coupler 32. The light ray 155 may then encounter the inner surface 156a of the light guide surface 23 and be reflected due to the treatment on the inner surface 156a. The light ray 155 may then be distributed out of the display device 10.

One advantage using reflective type optics is that the light guide 20 has a substantially thin surface (e.g., approximately 2–3 mm). The thin surface may allow for molding to be completed more easily because there may be less cracking, sinking, and shrinking of the light guide 20. Furthermore, a thin surface may not require the molding to be uniform because the imperfections that may arise due to a non-homogeneous surface may not cause any difficulties within a thin surface. In this embodiment, the high injection molding of the light guide 20 can be completed in a more efficient manner.

Figure 6B:
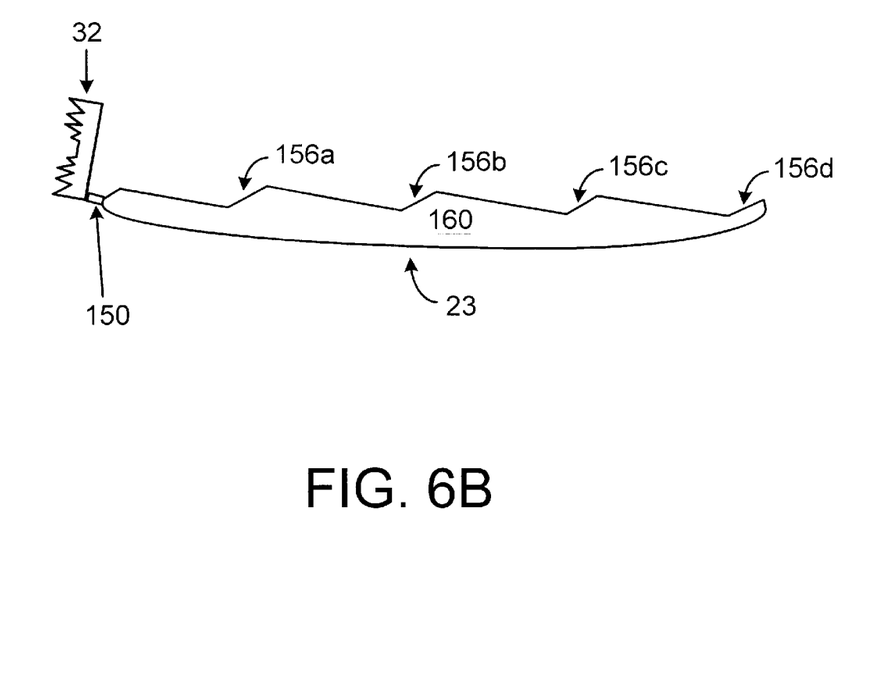

In an alternate embodiment, the first surface sections 22a–d are not substantially perpendicular to the light coupler 32 as shown in FIG. 6A. Furthermore, the light guide surface 23 may be a curved surface as shown in FIG. 6B. In one embodiment, light rays will be reflected off of the inner surfaces 156a–d and the light rays will not travel through the light guide surface 23. Therefore, in this embodiment, the structure of the light guide surface 23 may be designed to accommodate the placement of the display device 10.

Figure 7:
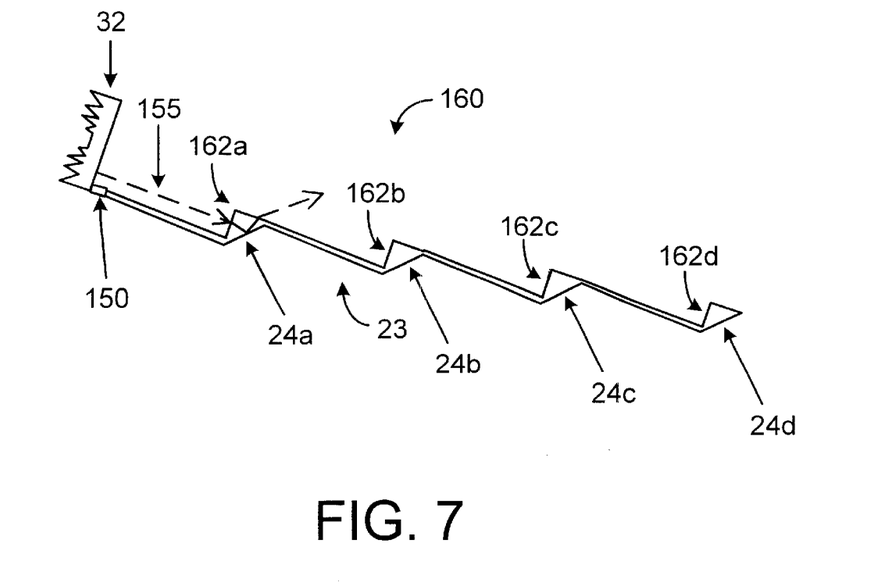
FIG. 7 is a side view of one embodiment of the display devices in FIGS. 5A and 5B.

In another embodiment, substantially parallel surfaces 162a–d are used with the light guides of FIGS. 6A and 6B. Referring to FIG. 7, the narrow light guide 160 is used with the hingedly attached light coupler 32 to direct light in an optimal direction. Area of the narrow light guide 160 may be more compressed than the light guide 20. The narrow light guide 160 may have substantially parallel surfaces 162a–d on an inner portion of the light guide surface 23. The second surface sections 24a–d may extend from the light source end 21 at planar angles to one another, but the surfaces 162a–d on an inner portion opposite the second surface sections 24 may be positioned substantially parallel to the light coupler 32. The light ray 155 may pass through the light coupler 32 and pass through the parallel surfaces 162 reflecting off the second surface sections 24. The narrow light guide 160 may be easier to mold because the narrow light guide 160 is not as complex as the light guide 20. Less substrate material may be used in molding the narrow light guide 160.

Figure 8:
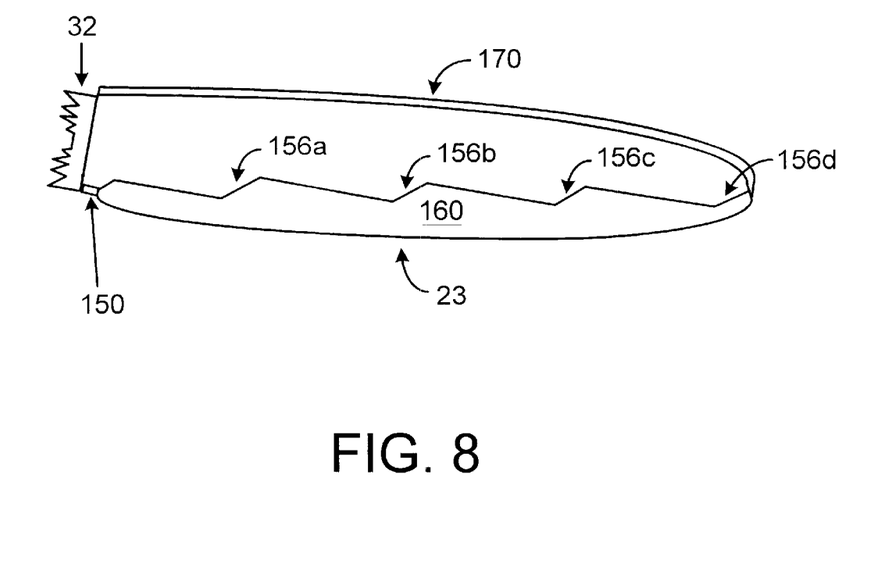
FIG. 8 is a side view of one embodiment of the display devices in FIGS. 5A and 5B with a separate outer lens.

In yet another embodiment, the light coupler 32 may be included with a separate outer lens depending on the manner of designing the light guide 20. An outer lens may be needed to cover the light source 42 to provide protection for the light source 42. The outer lens may be needed for use with the narrow light guide 160. For example, in the embodiment where the display device 10 contains only the light guide surface 23, an outer lens may be necessary. A partial outer lens can be provided to substantially cover the light source 42. A separate outer lens may act as a lens cover for the light coupler 32 which may further customize the direction in which the light may spread. The separate outer lens may comprise optical spreading elements 152 to direct the light in a desired direction. For example, the outer lens may be comprised of a plastic covering, such as a tail light cover, to provide a structure or housing for the light source 42. The separate outer lens may also provide cosmetic advantages for the light guide 20, such as a red tint appearance of the light.

Referring to FIG. 8, a side view of one embodiment of the display devices in FIGS. 5A and 5B with a separate outer lens is shown. The separate outer lens 170 may be comprised of plastic, glass, or any moldable transparent cover. As mentioned, the outer lens 170 may also contain optical spreading elements 152 to further customize the reflection of the light rays. The light rays radiated from the light source 42 will be reflected off the inner surfaces 156a–d of the narrow light guide 160, due to the treatment on the inner surfaces 156a–d, and the light rays will then pass through the outer lens 170. The outer lens 170 may be positioned onto the narrow light guide 160 after the light coupler 32 has been rotated into a desired position and angle using the hinge 150. The separate outer lens 170 may be used in the embodiments of FIG. 6A, FIG. 6B, and FIG. 7 as well.

In one embodiment, a lighting system may be provided using the display device 10. The lighting system may include at least one light source 42 and at least one light coupler 32 adjacent the one light source 42. The light coupler 32 may be hingedly attached adjacent the light source 42 to allow light to be directed through the light coupler 32. The lighting system may also provide an adjustable means to direct light in a desired direction. The hinge 150 may allow the light coupler 32 to rotate to a desired position and angle to comply with manufacturing constraints and requirements.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A display device comprising:
    at least one light source operable to radiate a light in a first direction;
    at least one light coupler adjacent the at least one light source to receive the light, the at least one light coupler being operable to distribute the light in the first direction;
    a light guide comprising a substrate material, the light guide having:

a light source end hingedly attached adjacent the at least one light coupler to receive the distributed light;

a light emitting surface extending from the light source end substantially along the first direction; and a light guide surface extending from the light source substantially along the first direction, the light guide surface being opposite the light emitting surface; and the light guide surface comprising a plurality of first surface sections, the first surface sections extending substantially non-parallel to the light emitting surface and each first surface section separated by at least one of a plurality of second surface sections, the second surface sections extending substantially non-parallel to the light emitting surface, the first surface sections extending at different angels from the second surface sections, at least one of the first and second surface sections being at a reflective angle to provide reflection of the light generated by the light source at the at least one first and second surface sections, the reflective angle of the at least one of the first and second surface sections further providing for refraction of the reflected light at the light emitting surface with a light distribution spread in a second direction.

2. The display device of claim 1, wherein:

at least one of the first surface sections extending at a second reflective angle from the light source end, the second reflective angle causing the light to reflect such that the reflected light from the at least one of the first surface sections diverges from the reflected light from the second surface sections.

3. The display device of claim 1, wherein:

at least one of the first surface sections extending at a second reflective angle from the light source end, the second reflective angle causing the light to reflect such that the reflected light from the at least one of the first surface sections converges from the reflected light from the second surface sections.

4. The display device of claim 1, wherein the substrate material may be a material selected from the group consisting of acrylic, polycarbonate, and plastic.

5. The display device of claim 1, wherein the at least one light source includes light source devices selected from the group consisting of light emitting diodes (LEDs), fiberoptic device outputs, tubular light sources, and incandescent lamps.

6. The display device of claim 1, wherein the at least one light coupler includes light coupling devices selected from the group consisting of a Fresnel lens, a substantially round ashperic lens, a substantially round spheric lens, and a substantially elliptical aspheric lens.

7. The display device of claim 1, wherein the at least one light coupler has a surface having at least one optical spreading element.

8. The display device of claim 1 comprising:

a plurality of light couplers arranged linearly; and a plurality of light sources arranged linearly, each light source being positioned adjacent a corresponding light coupler.

9. The display device of claim 1, wherein the plurality of second surface sections have inner surfaces substantially parallel to the at least one light coupler.

10. The display device of claim 1, further comprising an outer lens operatively coupled to the at least one light coupler.

11. The display device of claim 1, wherein the light guide surface includes a treatment on at least a portion of the light guide surface.

12. The display device of claim 11, wherein the treatment is selected from the group consisting of paint and metallization.

13. The display device of claim 1, wherein an inner portion of the light guide surface includes a treatment on at least a portion of the inner portion of the light guide surface.

14. A lighting system comprising:

at least one light coupler operable to receive light from at least one light source and also operable to distribute the light in a first direction;

a light guide comprising a substrate material, the light guide having:

a light source end hingedly attached adjacent the at least one light coupler to receive the distributed light;

a light emitting surface extending from the light source end substantially along the first direction; and a light guide surface extending from the light source substantially along the first direction, the light guide surface being opposite the light emitting surface.

15. The lighting system of claim 14, wherein the substrate material may be a material selected from the group consisting of acrylic, polycarbonate, and, plastic.

16. The lighting system of claim 14, wherein the substrate material is a moldable transparent material.

17. The lighting system of claim 14, wherein the at least one light source includes light source devices selected from the group consisting of light emitting diodes (LEDs), fiberoptic device outputs, tubular light sources, and incandescent lamps.

18. The lighting system of claim 14, wherein the at least one light coupler includes light coupling devices selected from the group consisting of a Fresnel lens, a substantially round ashperic lens, a substantially round spheric lens, and a substantially elliptical aspheric lens.

19. The lighting system of claim 14, wherein the at least one light coupler has a surface, the surface having optical spreading elements selected from the group consisting of a pillow form, and a flute form.

20. The lighting system of claim 14 comprising:

a plurality of light couplers arranged linearly; and a plurality of light sources arranged linearly, each light source being positioned adjacent a corresponding light coupler.

21. The lighting system of claim 14, further comprising an outer lens operatively coupled to the at least one light coupler.

22. The lighting system of claim 14, wherein the light guide surface includes a treatment on at least a portion of the light guide surface.

23. The lighting system of claim 22, wherein the treatment is selected from the group consisting of paint and metallization.

24. The lighting system of claim 14, wherein an inner portion of the light guide surface includes a treatment on at least a portion of the inner portion of the light guide surface.

25. The lighting system of claim 24, wherein the treatment is selected from the group consisting of paint and metallization.

26. The lighting system of claim 14, wherein the light guide surface includes a plurality of first surface sections, the first surface sections extending substantially non-parallel to the light emitting surface and each first surface section separated by at least one of a plurality of second surface sections, the second surface sections extending substantially non-parallel to the light emitting surface, the first surface sections extending at different angels from the second surface sections, at least one of the first and second surface sections being at a reflective angle to provide reflection of the light generated by the light source at the at least one first and second surface sections, the reflective angle of the at least one of the first and second surface sections further providing for refraction of the reflected light at the light emitting surface with a light distribution spread in a second direction.

27. The lighting system of claim 26, wherein:
   at least one of the first surface sections extending at a second reflective angle from the light source end, the second reflective angle causing the light to reflect such that the reflected light from the at least one of the first surface sections diverges from the reflected light from the second surface sections.

28. The lighting system of claim 26, wherein:
   at least one of the first surface sections extending at a second reflective angle from the light source end, the second reflective angle causing the light to reflect such that the reflected light from the at least one of the first surface sections converges from the reflected light from the second surface sections.

29. The lighting system of claim 26, wherein the plurality of second surface sections have inner surfaces substantially parallel to the at least one light coupler.

* * * * *